United States Patent
Sato et al.

[11] Patent Number: 5,851,289
[45] Date of Patent: Dec. 22, 1998

[54] APPLICATOR

[75] Inventors: Shogo Sato; Osamu Maniwa, both of Miyagi, Japan

[73] Assignee: Sony Corporation, Tokyo, Japan

[21] Appl. No.: 754,264

[22] Filed: Nov. 20, 1996

[30] Foreign Application Priority Data

Nov. 21, 1995 [JP] Japan .................................. 7-303070

[51] Int. Cl.⁶ .................................................. B05C 3/02
[52] U.S. Cl. ......................................... 118/411; 118/419
[58] Field of Search .................................. 118/411, 419; 427/549, 548, 550

[56] References Cited

U.S. PATENT DOCUMENTS

| | | | |
|---|---|---|---|
| 2,761,791 | 9/1956 | Russell | 118/411 |
| 3,413,143 | 11/1968 | Cameron | 118/411 |
| 3,627,564 | 12/1971 | Mercier | 118/411 |
| 3,681,138 | 8/1972 | Ankenbrand et al. | |
| 4,665,723 | 5/1987 | Zimmer et al. | 118/406 |
| 5,422,137 | 6/1995 | Huebler et al. | 427/122 |
| 5,601,647 | 2/1997 | Pertzoch et al. | 118/419 |

*Primary Examiner*—Brenda A. Lamb
*Attorney, Agent, or Firm*—Hill & Simpson

[57] ABSTRACT

An applicator in which a coating can be applied to a base material at high speed, a coating film can be thinned and a desired coating film can be obtained when the coating films of two or more layers are simultaneously formed. A die 2 is provided with a slit 5 for a lower layer and a slit 15 for an upper layer which respectively serve to extrude a coating 6 for the lower layer and a coating 16 for the upper layer to the base material. The coatings 6 and 16 are respectively extruded from these slits 5 and 15 to the continuously running base material 1 so that the coating films of two layers are formed. Lower layer lips 4 forming the lower layer slit 5 are provided so as to be not in contact with the base material 1. Upper lips 14 forming the upper layer slit 15 are provided so as to abut on the base material 1. When a magnetic coating is used as the coating 6 for the lower layer, a magnet part may be opposed to the lips 4 for the lower layer by sandwiching the base material 1 therebetween.

2 Claims, 3 Drawing Sheets

APPLICATOR

BACKGROUND OF THE INVENTION

1. Field of the invention

The present invention relates to what is called an extrusion-type applicator, and more particularly to an applicator for forming a plurality of coating film layers.

2. Prior Art

Generally, there has been used what is called an application-type magnetic recording medium, as an audio tape or a video tape, in which a magnetic coating obtained by dispersing and kneading magnetic powder, a binder, a dispersing agent, a lubricant, etc. into an organic solvent is applied onto a non-magnetic base material such as a polyester film so that a magnetic layer is formed.

Conventionally, an applicator using rolls such as gravure rolls or reverse rolls has been employed for applying a magnetic coating to a base material in order to manufacture the above mentioned application-type magnetic recording medium. Particularly, an applicator using a direct gravure method, which can apply a magnetic coating with the structural viscosity (thixotropy) of a wide range onto the base material, has been commonly put into practice.

A surface treatment such as a hard chrome treatment has been carried out onto the above mentioned gravure rolls, taking their abrasion resistances into consideration. The transferring characteristic of the coating to a base film as a base material from the rolls has been deteriorated owing to the structural viscosity of the magnetic coating so that the output fluctuation of the coating due to the unevenness in thickness of the coating or the dropping-out of the coating due to the splashing of the coating or the like has been liable to occur. As a coating speed becomes higher, these problems have been apt to be more distinguished.

Especially, when a magnetic coating having high structural viscosity or a metallic magnetic coating is transferred onto a base material with thickness of not less than 50 um, similarly to a case in which the magnetic layer of a floppy disk is formed, there has been readily formed air layers between the cell grooves of the gravure rolls and the base material, so that a defective transfer has been easily generated.

On the other hand, an attention has been paid to an extrusion (die)-type applicator as a new applicator which can overcome these shortcomings and has been partly already put into practice.

The above mentioned extrusion-type applicator is provided with a die having a coating reservoir to which a coating is supplied and a wide slit for extruding the coating to a tip end so that the coating is extruded from the slit and applied onto a continuously moving base material or carrier. In this applicator, a lip of lips forming the slit at their tip ends, which is located in the upstream side in the moving direction of the base material (called an upper lip, hereinafter), functions as a front blade to regulate the amount of coating to be extruded onto the base material. On the other hand, a lip provided in the downstream side (called a lower lip, hereinafter) abuts against the base material, is provided so as to hold the base material and functions as a doctor edge (smoothing blade) to smooth the surface of the coating supplied to the base material.

Such an extrusion-type applicator can easily form coating films having uniform thickness. Further, the extrusion-type applicator does not use rolls of large diameter, so that it is preferably advantageous in terms of the establishment of the low cost and small size of the device. In addition, since the coating supplied into the die is all applied to the base material, the coating does not need to be circulated around the die. Thus, the applicator has been employed in the fields of photographic films or photographic paper or the like.

Furthermore, if the extrusion-type applicator is provided with a plurality of coating solution reservoirs and a plurality of slits on the same die, a plurality of layers of coating films can be advantageously formed at the same time.

However, in order to improve productivity in the magnetic recording medium, it is simultaneously required to decrease the thickness of the coating films and increase the speed for applying the coating to the base material or carrier. Therefore, when the coating films are to be formed by the above described extrusion-type applicator, there are often encountered following problems as mentioned below.

Firstly, according to the applicator described above, since an upper lip 107 is made to come into contact with a base material 101 or to come extremely close to the base material 101, as main parts are illustrated in FIG. 1, it is difficult to balance the pressure of a coating 106 extruded from a slit 105 with the tension of the base material 101, air is apt to enter the coating or the overflow of the coating is liable to be easily caused. Then, when the coating is applied to the base material or carrier at higher speed, reduced pressure because of Bernoulli's theorem is exerted on the coating 106, the above described problems arise more remarkably. FIG. 2 shows the relation between an angle of wrapping the base material 101 by both lips 107 and 108 (referred to as a wrapping angle for a base material, hereinafter) and an application characteristic. Referring to FIG. 2, it is found that an effective coating range in which a satisfactory coating-applying operation can be carried out without generating the overflow or the broken stripes of coating becomes narrower, as the coating speed is increased.

Further, according to the above applicator, when a foreign material on the base material 101 is caught by the lower lip 108, a failure such as the generation of stripes is liable to occur. When the base material 101 vibrates, the base material 101 comes into contact with the upper lip 107 so that the base material 101 is undesirably cut.

Still further, a plurality of layers of coating films are simultaneously formed, and therefore, when a plurality of coating solution reservoirs and a plurality of slits are provided on the same die, it becomes more difficult to desirably form the coating films after a second layer because the problems as mentioned above have been already generated during formation of the coating film of a first layer.

Still further, as described above, when the overflow or broken stripes of the coating are formed during application of the coating, the percent of defective of products is inconveniently increased. In addition, when the base material having the coating film part poor in surface characteristic is wound, the shape of a roll is deteriorated, so that the quality of all the roll is disadvantageously degraded.

Under the actual circumstances as stated above, according to the conventional applicator, upon high speed application of the coating and formation of thin coating films, desired effects cannot be obtained. Thus, it is more difficult to achieve a satisfactory effect when a plurality of layers of coating films are formed.

OBJECT AND SUMMARY OF THE INVENTION

Accordingly, the present invention was proposed in order to overcome the above mentioned problems of the conventional applicator and it is an object of the present invention to provide an applicator in which the high-speed application of a coating and the formation of thin coating films can be realized, and a plurality of layers of coating films with good quality can be simultaneously obtained.

To attain the above mentioned object, according to the invention, there is provided an extrusion-type applicator having a die provided with a plurality of coating reservoirs to which a coating is supplied and a plurality of slits for extruding the coating to their tip ends so that the coating is extruded onto a continuously moving base material respectively from the plurality of slits and a plurality of layers of coating films are formed, the applicator comprising: lips (called lips for a lower layer, hereinafter) forming the slit for forming the coating film of a first layer which are provided so as to be not in contact with the base material; and lips (called lips for an upper layer, hereinafter) forming the slit for forming the coating films after a second layer which are provided so as to abut on the base material.

Specifically described, since the lips for the lower layer do not come into contact with the base material or carrier during forming the coating film of the first layer, the upper lip of these lips (referred to as an upper lip for a lower layer, hereinafter) does not function as a front blade, nor the lower lip of these lips (referred to as a lower lip for a lower layer, hereinafter) functions as a smoothing blade. Therefore, these lips for the lower layer do not break nor shave the surface of the base material, so that broken stripes due to dust, foreign materials, the chip powder of the base material, etc. are hardly produced on the coating film of the first layer.

Then, when the coating film of a second layer is formed, the lips for the upper layer are made to abut on the base material or carrier. However, actually, the coating film of the first layer has been already formed on the base material, so that the lips for the upper layer come into contact with the base material through this coating film and the slit for forming the coating film of the second layer is subjected to a liquid-sealing. Therefore, the upper lip (referred to as an upper lip for an upper layer, hereinafter) of the lips for the upper layer can act as a front blade and completely prevent the entry of air to the coating and the overflow of the coating. Further, the lower lip (referred to as a lower lip for an upper layer) can act as a smoothing blade and smooth the surface of the coating film.

In such a way, when the slit for forming the coating film of the second layer is liquid-sealed, the coating film of the first layer is replaced by an associated air layer so that the wettability of the coating film of the first layer with the coating extruded from the above slit is improved. Thus, the interruption of air into the coating can be prevented and a thin coating film can be formed at high speed.

The coating films of three or more layers can be simultaneously formed by employing the applicator of the present invention. In this case, lips for forming coating films after a third layer may have a similar structure to that of the lips for forming the coating film of the second layer.

Herein, when a magnetic coating is extruded from the slit for forming the coating film of the first layer, a magnet part is preferably provided in a position opposite to the lips for the lower layer forming the above described slit by sandwiching the base material therebetween. This is made because the movement of the magnetic coating extruded from the slit can be held by virtue of magnetic flux from the magnet part. In this case, if the lips for the lower layer are respectively formed with a non-magnetic material, the direction of the magnetic flux can be concentrated to the magnetic coating. It is to be noted that a magnet part may be provided relative to the lips for the upper layer forming the slit for forming the coating films after the second layer.

As the magnet part, one, may be preferable, whose tip ends are adjacent to each other to form a magnetic gap therebetween. The magnet part may be entirely formed with a permanent magnet, or provided with yokes made of a material with high magnetic permeability and a permanent magnet held therebetween. Further, as the permanent magnet, any one of those conventionally well-known may be used, which include alnico magnets, rare earth magnets, ferrite magnets or the like. An electromagnet may be employed in place of the permanent magnet. Further, in order to excellently hold the movement of the magnetic coating, a gap or clearance between the tip end of the magnet part and the tip ends of the lips for the lower layer is preferably 0.2 to 3 mm. The magnet part is preferably set relative to the lips for the lower layer so that the upper end face of the magnetic gap is located within a range of ±1 mm with respect to the height of the upper end face of the slit formed by the lips for the lower layer. Further, magnetic force produced in the vicinity of the lips for the lower layer may be suitably selected depending on a coating application speed or coating characteristic (viscosity, surface tension, etc.) and preferably located within a range of 500 to 600 gauss, particularly 3000 to 6000 gauss.

In the applicator as mentioned above, if the arrangement of the die and the magnet part relative to the base material is assured, the running direction of the base material and the orientations of the die and the magnet part can be arbitrarily set. Therefore, the description of "the upper lip" and "lower lip" in this specification does not necessarily mean that the upper lip is present in the upper side in the vertical direction relative to the lower lip, but represent an upstream side and a downstream side in the running direction of the base material.

The above applicator is preferably applicable to the production of for a magnetic recording medium having a lamination structure composed of two or more magnetic layers or having a lamination structure of a magnetic layer and a non-magnetic layer. In this case, it is to be understood that any of conventionally known materials for forming the base material, the magnetic coating or the like may be employed without limitation.

As the base material, there are exemplified polyesters such as polyethylene telephthalate, polyolefines such as polyethylene, polypropylene, cellulose derivatives such as cellulose triacetate, cellulose diacetate, cellulose butylate, vinyl resins such as polyvinyl chloride, polyvinylidene chloride, high polymer bases formed with plastics such as polycarbonates, polyimides, polyamides, a metal base composed of Al alloy and titanium alloy, a ceramic base, a glass base or the like composed of alumina glass or the like. The shape of the base material is not limited to one and the base material may be formed in any shape of a tape, a sheet, a drum or the like. When a rigid base such as an Al alloy plate or a glass plate is used, an oxide film obtained by an alumite treatment or Ni—P film or the like may be formed on the surface of the base so that the surface is hardened. When it is considered that the base material continuously moves, the base material may be desirably formed with a flexible material and in the shape of a tape or a sheet.

In the meantime, for magnetic powder forming the magnetic material, materials mentioned below may be preferably used. They are ferromagnetic metal materials such as Fe, Co, Ni, various kinds of ferromagnetic alloy materials including Fe, Co and Ni as main components, such as Fe—Co, Fe—Ni, Fe—Co—Ni, Co—Ni, Fe—Mn—Zn, Fe—Ni—Zn, Fe—Co—Ni—Cr, Fe—Co—Ni—P, Fe—Co—B, Fe—Co—Cr—B, Fe—Co—V and ferromagnetic metal particles composed of alloy materials such as Mn—Bi, Mn—Al. Further, in order to improve various characteristics, elements such as Al, Si, Ti, Cr, Mn, Cu, Zn, Mg, P may be added to the above described materials. Still further, the magnetic powder may be conventionally well-known type oxide magnetic powder such as γ—$Fe_2O_3$, γ—$Fe_2O_3$ containing Co, $Fe_3O_4$, γ—$Fe_3O_4$ containing Co, Co adhering γ—$Fe_3O_4$, $CrO_2$ or the like.

For binders used together with the above mentioned magnetic powder, there are exemplified polymers such as vinyl chloride, vinyl acetate, vinyl alcohol, vinylidene chloride, acrylic ester, methacrylic ester, styrene, butadiene, acrylonitrile or copolymers obtained by combining two or more of them, polyurethane resins, polyester resins, epoxy resins, etc. Particularly, vinyl copolymers, polyester-polyurethane copolymers, polycarbonate-polyurethane copolymers, nitrocellulose or the like may be preferably employed.

For solvent used to distribute these binder and magnetic powder, there are enumerated ketones such as acetone, methyl ethyl ketone, methyl isobutyl ketone, cyclohexanone, esters such as methyl acetate, ethyl acetate, butyl acetate, ethyl lactate, glycol acetate monoethyl ether, grycol ethers such as glycol dimethyl ether, grycol monoethyl ether, dioxane, aromatic hydrocarbons such as benzene, toluene, xylene, aliphatic hydrocarbons such as hexane, heptane, chlorinated hydrocarbons such as methylene chloride, ethylene chloride, carbon tetrachloride, chloroholm, ethylene chlorohydrin, dichlorobenzene.

A dispersing agent, a lubricant, an abrasive, an antistatic agent, a rust inhibitor or the like may be added, as an additive, into such a magnetic coating.

When a non-magnetic coating also is applied to the base material prior to the magnetic coating, any of conventionally known materials may be used for the non-magnetic coating.

Additionally, a back coat layer or a top coat layer or the like may be formed on the above mentioned base material, as desired. In this case, it is to be understood that conditions for forming a film such as the back coat layer, the top coat layer or the like may be applicable to a common method for manufacturing the above described kind of magnetic recording medium and are not limited to a particular method.

The applicator according to the present invention can be utilized not only for applying the magnetic coating onto the base material, but also for applying the magnetic coating to the back coat layer or the top coat layer in the manufacturing processes of such an application-type magnetic recording medium.

Further, the applicator according to the present invention may be applicable to the production fields of photographic films or photographic paper, etc.

DETAILED DESCRIPTION OF THE PREFERRED EMBODIMENTS

Referring to the accompanying drawings, specific embodiments to which the present invention is applied will be described hereinafter.

First Embodiment

An applicator according to the first embodiment is designed to simultaneously apply two kinds of coatings onto a base material.

Figure 1:
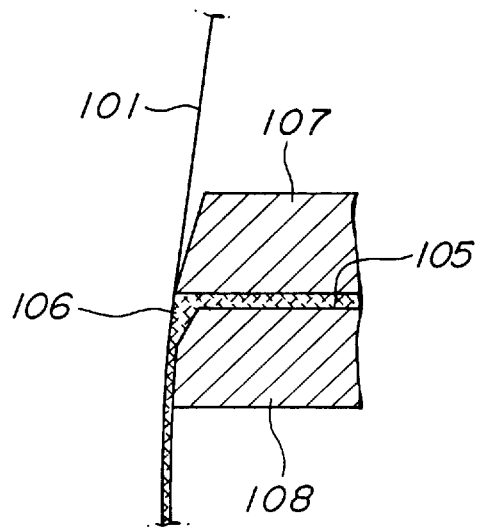
FIG. 1 is a schematic sectional view showing main parts of a conventional applicator.
Figure 2:
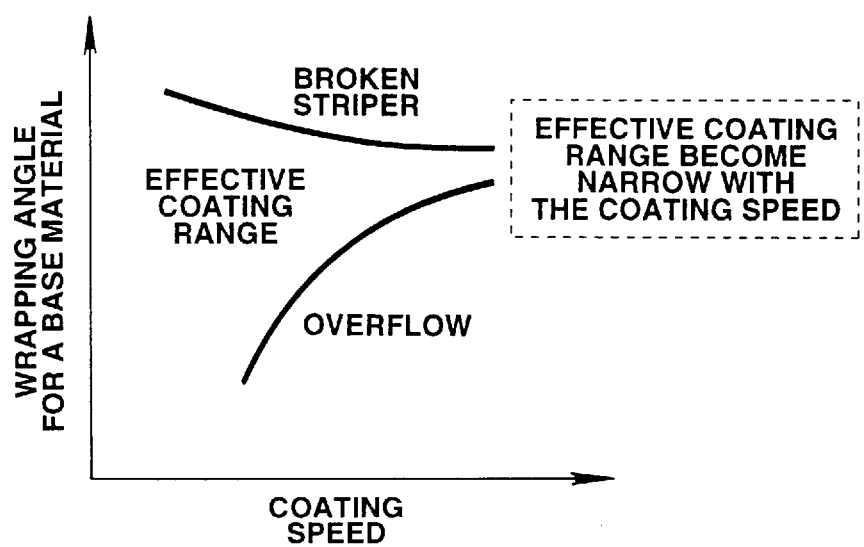
FIG. 2 is a characteristic view showing that the relation between a wrapping angle for a base material and a coating applying characteristic depends on a coating applying speed.
Figure 3:
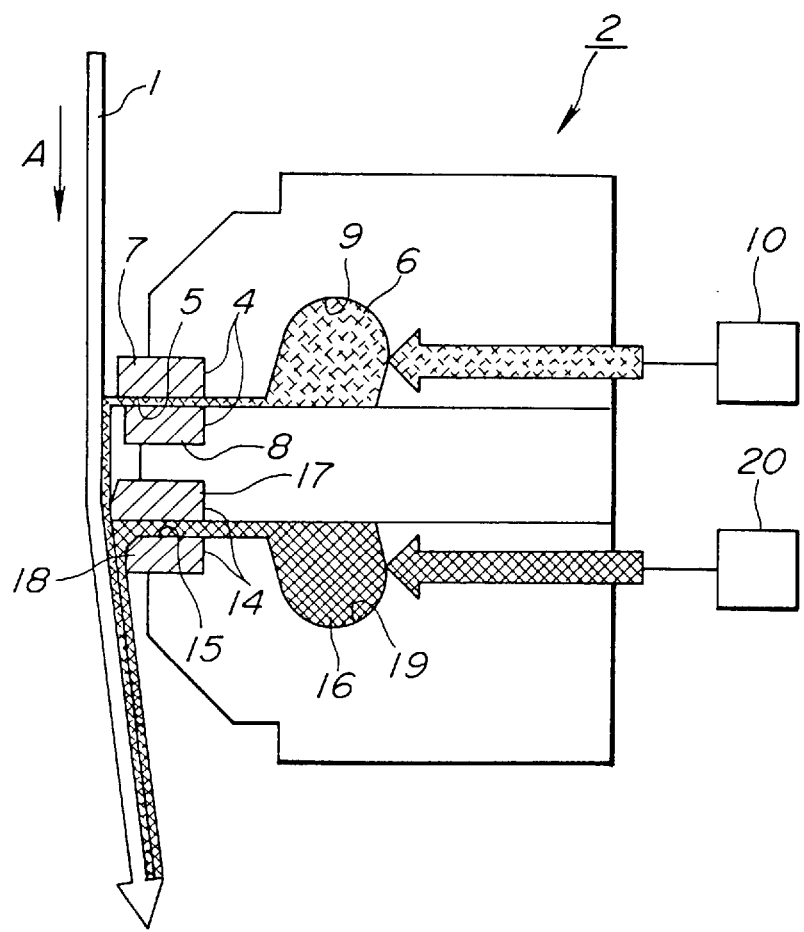
FIG. 3 is a schematic sectional view showing an embodiment of an applicator according to the present invention.

Specifically, as illustrated in FIG. 3, a die (extruder) 2 made with a substantially rectangular parallelepiped shaped metal block is provided in the intermediate part of a section where a non-magnetic and flexible base material 1 sequentially moves from a supply side to a take-up side in the direction A in the figure.

At the tip end of the die 2, lips 4 for a lower layer are provided with a prescribed space from the surface of the base material 1 in the upstream side of the moving direction of the base material 1. Lips 14 for an upper layer are provided in the downstream side of the moving direction of the base material 1 so that the lips 14 abut on the surface of the base material 1.

The lips 4 for the lower layer are formed with a non-magnetic material and a slit 5 for a lower layer having a width corresponding to a coating applied width is formed to face the end faces of the lips 4. The slit 5 for the lower layer serves as a clearance from which a coating 6 for the lower layer is extruded.

The slit 5 is generally a very narrow clearance as narrow as 0.01 to 2.0 mm. In this embodiment, the tip end of the lower lip 8 of the lips 4 for the lower layer is retracted from the tip end part of an upper lip 7. Further, both the lips 7 and 8 are not in contact with the base material 1.

The lips 14 for the upper layer is formed with a non-magnetic material and a slit 15 for the upper layer having a width corresponding to a coating applied width is formed to face the end faces of the lips 14. The slit 15 for the upper layer serves as a clearance from which a coating 16 for the upper layer is extruded. The slit 15 is ordinarily an extremely narrow clearance as narrow as 0.01 to 2 mm. In this embodiment, the lips 14 for the upper layer are provided so that the lips 14 abut on the base material 1. The part near the tip end of the upper lip 17 of the lips 14 for the upper layer acts as a front blade so that the amount of application of the coating 16 for the upper layer, is regulated, which is extruded onto the base material 1 through the slit 15 for the upper layer. The part of the tip end of a lower lip 18 acts as a smoothing blade so that the surface of the coating 16 for the upper layer, which is extruded onto the base material 1, is smoothed.

Pockets (coating solution reservoirs) 9 and 19, which respectively communicate with these slits 5 and 15, are formed in the rear surface sides of the slit 5 for the lower layer and the slit 15 for the upper layer. These pockets 9 and 19 are formed in orifice shaped spaces having lengths substantially equal to the widths of the slits 5 and 15.

Coating solution supply ports, which are respectively not shown, are formed so as to be opened to both the end faces of the die 2 at both the end parts of the pockets 9 and 19. Coating solution supply pipes for guiding the coating 6 for the lower layer and the coating 16 for the upper layer are respectively connected to the coating solution supply ports. Further, pumps 10 and 20 are attached to the intermediate parts of these coating solution supply pipes. Thus, the coating 6 for the lower layer is fed under a prescribed pressure to the pocket 9 from the coating solution supply pipe by the pump 10. The coating 16 for the upper layer is also fed under a prescribed pressure to the pocket 19 from the coating solution supply pipe by the pump 20. Accordingly, the pockets 9 and 19 serve as spaces for receiving the coating 6 for the lower layer and the coating 16 for the upper layer which are supplied under pressure and have the functions of accumulators. Then, the coating 6 for the lower layer fed under pressure to the pocket 9 is supplied into the slit 5 for the lower layer and further extruded to the surface of the moving base material 1 from the tip end part of the slit 5 for the lower layer. The coating 16 for the upper layer fed under pressure to the pocket 19 is supplied into the slit 15 for the upper layer and further extruded to the surface of the coating film of the above described coating 6 for the lower layer on the base material 1 from the tip end part of the slit 15 for the upper layer.

In the means time, the base material 1 or carrier to which the coating 6 for the lower layer and the coating 16 for the upper layer are applied by the above mentioned die 2 is supported by guide rolls not shown. Appropriate tension is exerted on the base material through the guide rolls so that the base material can move smoothly. The guide rolls are movably provided so as to adjust a space between the base material 1 and the tip ends of the lips 4 for the lower layer and the amount of holding the base material 1 by the lips 14 for the upper layer.

According to the applicator having the above described structure, immediately after the coating 6 for the lower layer extruded from the slit 5 for the lower layer is applied to the surface of the base material 1 running in the direction A in the figure, the coating 16 for the upper layer extruded from the slit 15 for the upper layer can be applied to the base material.

In the present applicator, since the tip ends of the lips 4 for the lower layer do not abut on the base material 1, the surface of the base material 1 is not broken nor cut. Thus, broken stripes due to dust, foreign materials, chip powder of the base material or the like are hardly produced on the formed coating film. Further, since the tip ends of the lips 14 for the upper layer abut on the base material 1 through the coating film of the coating 6 for the lower layer, the slit 15 for the upper layer is liquid-sealed. As a result, the film of the coating 6 for the lower layer is replaced by an associated air layer, so that the wettability of the film of the coating 6 for the lower layer with the coating 16 for the upper layer extruded from the slit 16 for the upper layer is improved. Therefore, the interruption of air into the coating 16 for the upper layer can be prevented and a thin coating film can be formed at high speed.

As seen in FIG. 3, the die is arranged so that the coating can be applied to the base material 1 moving vertically from an upper part to a lower part. However, the applicator according to the present embodiment of the invention is not limited to the above described arrangement. Specifically, if the position of the die 2 relative to the moving base material 1 can be maintained, the moving direction of the base material and the orientation of the die 2 may be arbitrarily set and the die 2 may be rotated by any angle.

Second Embodiment

An applicator according to the second embodiment of the present invention comprises a magnet part opposed to lips 4 for a lower layer by sandwiching a base material or carrier 1 therebetween.

Figure 4:
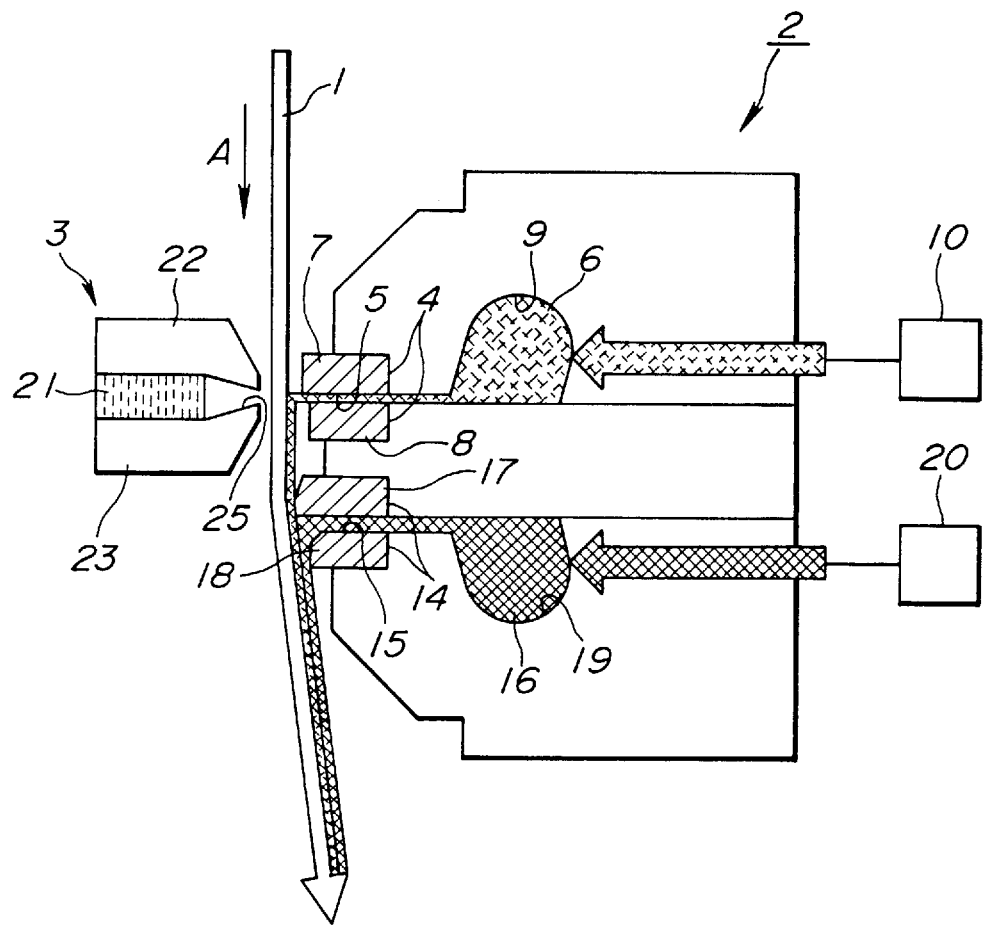
FIG. 4 is a schematic sectional view showing another embodiment of an applicator according to the present invention.

According to the applicator of the second embodiment, as illustrated in FIG. 4, a die 2 is disposed relative to the base material 1 moving similarly to that shown in the first embodiment and a magnet part 3 is provided with a prescribed distance spaced in a side opposite to the lips 4 for the lower layer by sandwiching the base material 1 therebetween.

This magnet part 3 comprises a permanent magnet 21 having a north pole N at its upper part and a south pole S at its lower part and sandwiched between an upper yoke 22 and a lower yoke 23 which are made of a material with high magnetic permeability. The upper yoke 22 and the lower yoke 23 have respectively one end protruding longer than the permanent magnet 21 and gradually thinned toward its tip end. Further, the tip end of the lower yoke 23 is bent so as to be adjacent to the tip end of the upper yoke 22.

Therefore, a magnetic gap is formed between the tip end of the upper yoke 22 and the tip end of the lower yoke 23 in the magnet part 3, so that a magnetic flux is generated.

The above described magnet part 3 is fixed to a support base not shown which enables the magnet part 3 to be moved horizontally and vertically so that a clearance between the tip ends of the yokes 22 and 23 and the tip ends of the lips 4 for the lower layer and the position of height of the magnetic gap 25 relative to the slit 5 for the lower layer can be adjusted.

Other structure of the applicator according to the second embodiment is the same as that of the applicator shown in the first embodiment. Therefore, the same members as those shown in the first embodiment are represented by the same reference symbols as those used in FIG. 3, and thus, the explanation thereof will be omitted.

In the applicator having the above mentioned structure, when a magnetic coating is applied, as a coating 6 for a lower layer, to the base material 1, the movement of the coating 6 extruded from the slit 5 for the lower layer can be retained by virtue of the magnetic flux from the magnetic gap 25 in the magnet part 3, so that an effective coating application can be carried out.

DESCRIPTION OF EXAMPLES

In order to study the application performances of the applicators shown in the first and second embodiments, a coating was actually applied to a base material by using these applicators.

Example 1

Herein, in order to examine the application performance of the applicator shown in the first embodiment, a non-magnetic coating was used as the coating 6 for the lower layer and a magnetic coating was used as the coating 16 for the upper layer.

Specifically, the applicator as shown in FIG. 3 was used and the non-magnetic coating and the magnetic coating were continuously applied to the moving base material 1 under conditions described below.

Setting in the Applicator
(Die)
total width: 160 mm
material of lips 4 for a lower layer: sintered hard alloy
    (non-magnetic material)
clearance of a slit 5 for a lower layer: 0.03 mm
applied width of coating 6 for a lower layer: 110 mm distance between lips 4 for a lower layer and a base material 1:
    1 to 2 mm
material of lips 14 for an upper layer: sintered hard alloy
                                (non-magnetic material)
clearance of a slit 15 for an upper layer: 0.26mm
applied width of coating 16 for an upper layer: 100mm
(coating)
type of coating 6 for a lower layer: carbon coating for a back
coat                                (solid matter ½)
thickness of coating 6 for a lower layer: 1.0 um (after dried
type of coating 16 for an upper layer: for forming the magnetic
layer of a VHS tape thickness of coating 16 for an upper layer:.
                                2 um (after dried)

(Base Material)

width: 126 mm
thickness: 14.5 um
material: polyethylene terephthalate
tension upon application:

3 kgf for total width of a base material 1

Then, the moving speed of the base material 1 was changed within a range of 100 to 900 m/min. and the conditions of the formed coating films of two layers were observed. The obtained results were shown in Table 1.

TABLE 1

| moving speed (m/n) | applied state |
|---|---|
| 100 | o |
| 200 | o |
| 300 | o |
| 400 | o |
| 500 | o |
| 600 | o |
| 700 | o |
| 800 | o |
| 900 | x |

As show in table 1, when the coating was applied to the base material in accordance with the above mentioned conditions, the replacement of associated air by the film of the coating 6 for the lower layer was incomplete upon applying of the coating 16 for the upper layer under a condition in which the moving speed of the base material 1 was not lower than 700 m/min, resulting in the generation of unevenness in stripes. Further, under the speed not lower than 900 m/min, the base material 1 could not be moved. However, when the moving speed of the base material 1 was lower than 600 m/min, the coating could be applied to the base material 1 without generating difficulties.

Thus, it was found that the applicator according to the first embodiment could continuously form the coating films of two layers at high speed without producing broken lines or the overflow of the coating.

Example 2

Herein, the width of the base material 1 and the applied width of the coating or the like were made different from those of the Example 1 and the magnetic coating was applied to the base material 1.

Specifically, the applicator as shown in FIG. 3 was used and the non-magnetic coating and the magnetic coating were successively coated to the moving base material 1 under conditions described below.

Setting in the Applicator
(Die)
total width: 700 mm
material of lips 4 for a lower layer: sintered hard alloy
                                (non-magnetic material)
clearance of a slit 5 for a lower layer: 0.15 mm
applied width of coating 6 for a lower layer: 600 mm
material of lips 14 for an upper layer: sintered hard alloy
                                (non-magnetic material)
clearance of a slit 15 for an upper layer: 0.26 mm
applied width of coating 16 for an upper layer: 590 mm
(Coating)
type of coating 6 for a lower layer: carbon coating for a back
coat
thickness of coating 6 for a lower layer: 0.7 um (after dried
type of coating 16 for an upper layer: for forming the magnetic
layer of a VHS tape thickness of coating 16
for an upper layer: 2 um (after dried)

(Base Material)

width: 620 mm
thickness: 14.5 um
material: polyethylene terephthalate
tension upon application:

15 kgf for total width of a base material 1

Then, the moving speed of the base material 1 was changed within a range of 100 to 500 m/min and the conditions of the formed coating films of two layers were observed. The obtained results were shown in Table 2.

TABLE 2

| moving speed (m/n) | applied state | |
|---|---|---|
| | Example 2 | Comparative Example |
| 100 | o | o |
| 150 | o | o |
| 200 | o | o |
| 250 | o | o |
| 300 | o | x |
| 350 | o | x |
| 400 | o | x |
| 450 | o | x |
| 500 | x | x |

As show in table in Table 2, when the coating was applied to the base material in accordance with the above mentioned conditions, the overflow of the coating was generated so that the coating application cannot be done upon applying of the coating 6 for the lower layer under a condition in which the moving speed of the base material 1 was not lower than 500 m/min. However, when the moving speed of the base material 1 was lower than 450 m/min, the coating could be applied to the base material 1 without generating troubles.

Thus, it was found that the applicator according to the first embodiment could continuously form the coating films of two layers at high speed without producing broken lines or the overflow of the coating, even when the applied width of the coating or the like was changed.

Further, in order to examine an effect obtained from a state where the lips 14 for the upper layer come into contact with the film of the coating 6 for the lower layer, the coating was similarly applied to the base material by using an applicator having the same structure shown in the first embodiment except that the upper lip 17 of the lips 14 for the upper lower was not in contact with the coating 6 for the lower layer. Thus, the obtained results are also shown as a Comparative Example in Table 2.

As shown in Table 2, when the moving speed of the base material 1 was not lower than 300 m/min, the overflow of the coating was generated during applying of the coating 16 for the upper layer so that the coating applying operation could not be carried out.

Accordingly, it was found that the lips 14 for the upper layer coming into contact with the film of coating 6 for the lower layer was extremely effective for the high-speed application of the coating.

Example 3

In this Example, a magnetic coating was also used as the coating 6 for the lower layer in order to study the application performance of the applicator according to the second embodiment of the invention.

Specifically, the applicator as shown in FIG. 4 was used and two kinds of magnetic coatings were successively applied to the moving base material 1 under conditions described below.

```
Setting in the Applicator
(Die)
total width: 160 mm
material of lips 4 for a lower layer: sintered hard alloy
                                     (non-magnetic material)
clearance of a slit 5 for a lower layer: 0.26 mm
applied width of coating 6 for a lower layer: 110 mm
distance between lips 4 for a lower layer and a base material 1:
                                     1 to 2 mm
material of lips 14 for an upper layer:
sintered hard alloy (non-magnetic material)
clearance of a slit 15 for an upper layer: 0.26 mm
applied width of coating 16 for an upper layer: 100 mm
(Coating)
type of coating 6 for a lower layer: for forming the magnetic
layer of an audio tape (not using iron oxide magnetic powder)
thickness of coating 6 for a lower layer: 1.0 um (after dried)
type of coating 16 for an upper layer: for forming the magnetic
                                     layer of a VHS video tape
thickness of coating 16 for an upper layer 2 um (after dried)
(Magnet Part)
total width: 150 mm
permanent magnet 21: neodymium alloy magnet
generating magnetic force of 4000 gauss on its surface
yokes 22, 23: structural carbon steel ( magnetic force of 3800
                                     gauss at tip end)
```

(Base Material)
width: 126 mm
thickness: 14.5 um
material: polyethylene terephthalate
tension upon application:
  3 kgf for total width of a base material 1

Then, the moving speed of the base material 1 was changed within a range of 100 to 900 m/min. and the conditions of the formed coating films of two layers were observed. The obtained results were shown in Table 3.

TABLE 3

| moving speed (m/n) | applied state | |
|---|---|---|
| | Example 3 | Comparative Example |
| 100 | O | Δ |
| 200 | O | Δ |
| 300 | O | Δ |
| 400 | O | Δ |
| 500 | O | Δ |
| 600 | O | x |
| 700 | O | x |

TABLE 3-continued

| moving speed (m/n) | applied state | |
|---|---|---|
| | Example 3 | Comparative Example |
| 800 | O | x |
| 900 | x | x |

As shown in Table 3, when the coating was applied to the base material in accordance with the above mentioned conditions, the base material 1 could not be moved under a state in which the moving speed of the base material 1 was not lower than 900 m/min. However, when the moving speed of the base material 1 was lower than 800 m/min, the coating could be applied to the base material 1 without generating difficulties.

Thus, it was found that the applicator according to the second embodiment could form the coating films of two layers at high speed without producing broken lines or the overflow of the coating.

Herein, while the lips 4 for the lower layer were formed with the non-magnetic material, the lips 4 for the lower layer were also formed with a magnetic material for comparison and the magnetic coating was similarly applied to the base material. Thus, the obtained results were shown as Comparative Example in Table 3.

As shown in Table 3, when the lips 4 for the lower layer were made with the magnetic material, the surface of the film of the coating 6 for the lower layer was roughened even under a state in which the running speed of the base material 1 was within a range of 100 m/min to 500 m/min, because the coating 6 for the lower layer circulates and enters the lips 4 for the lower layer. When the running speed of the base material 1 was not lower than 600 m/min, the coating 6 for the lower layer could not spread on the base material 1.

Thus, it was found that when the applicator having the magnet part 3 opposed to the lips 4 for the lower layer was used and the magnetic coating was employed as the coating 6 for the lower layer was applied to the base material, as shown in the second embodiment, the lips 4 for the lower layer was preferably formed with the non-magnetic material. This allows a magnetic flux from the magnetic part 3 from the magnet part 3 to concentrate to the coating 6 for the lower layer made of the magnetic material so that the movement of the coating 6 for the lower layer can be desirably maintained.

Although the applicator according to the present invention has been stated in the foregoing, it is to be noted that the applicator of the invention is not limited to the above mentioned embodiments and the conditions of the above mentioned Examples, and various modifications and changes may be made without departing the scope of the present invention.

For example, although the applicators according to the first and second embodiments are constructed so that the coating 6 for the lower layer and the coating 16 for the upper layer are extruded respectively from the two slits comprising the slit 5 for the lower layer and the slit 15 for the upper layer to thus form the coating film of two layers, the applicator may be constructed so that the coating films of three or more layers can be simultaneously formed. In this case, lips for forming coating films after a third layer may preferably have a structure similar to that of the lips 14 for the upper layer.

Further, although according to the second embodiment, the magnet part 3 is opposed only to the lips 4 for the lower layer, similar magnet part 3 may be also opposed to the lips 14 for the upper layer. Still further, although the neodymium alloy magnet is used as the permanent magnet 21 in the magnet part 3, a magnet made of other material having a desired magnetic force may be employed. Still further, an electromagnet may be used in place of the permanent magnet 21. Additionally, the shapes of the yokes 22 and 23 in the magnet part 8 may be constructed so that the tip ends of the magnet part are adjacent to each other so as to form the magnetic gap 25 of a desired width between both the tip ends. The lower yoke 23 does not need to be necessarily bent.

Further, the moving direction of the base material 1 and the orientations of the die Z and the magnet part 3 can be arbitrarily changed. Furthermore, types of the coating 6 applied to the base material 1 or fields to which the invention is applied or the like are not limited to those described in the specification.

As apparent from the above description, according to the applicator of the present invention, when the coating for the lower layer is applied to the base material, the lips do not come into contact with the base material and when the coating for the upper layer is applied to the base material the lips abut on the base material through the film of the coating for the lower layer, so that the coatings for the lower layer and the upper layer can be applied at high speed to the base material to obtain excellent coating films.

When the magnetic coating is applied, as the coating for the lower layer, to the base material, the magnetic part is provided so that the movement of the magnetic coating supplied onto the base material can be retained by virtue of a magnetic flux.

Therefore, when the applicator according to the present invention is employed an abnormal movement of the coating can be prevented from arising at the time of a high speed coating application and the application of a thin coating film so that a coating applying operation can be stably carried out. Accordingly, an excellent coating film can be formed with good productivity by utilizing the present invention.

What is claimed is:

1. An applicator having a die provided with two or more coating reservoirs to which coatings are supplied and two or more slits for extruding the coatings so that the coatings are extruded onto a continuously moving base material respectively from the two or more slits for forming layers of coatings on the base material, the applicator comprising:

a first pair of lips defining a first slit for forming a first layer of one of the coatings on the base material, the first pair of lips provides so as to be not in contact with the base material;

a second pair of lips defining a second slit for forming a second layer of one of the coatings over the first layer, one lip of the second pair adapted to abut against the first layer and the other lip of the second pair adapted to wipe against the second layer during its forming; and a magnet part provided in a side of the base material opposite to a side facing the first pair of lips sandwiching the base material between the first pair of lips and the magnet part.

2. An applicator according to claim 1, further comprising one or more subsequent pairs of lips, each defining a subsequent slit, for forming one or more subsequent layers of one of the coatings over the second layer, one lip of each subsequent pair adapted to abut against a last applied layer, and the other of the subsequent pair adapted to wipe against a layer during its forming just applied over the last applied layer.

* * * * *